United States Patent [19]

Narayan

[11] 4,148,980
[45] Apr. 10, 1979

[54] NOVEL CARBOXYLATE CATALYSTS FOR THE PREPARATION OF FOAMS CHARACTERIZED BY POLYISOCYANURATE, POLYURETHANE AND POLY (URETHANE-ISOCYANURATE) LINKAGES

[75] Inventor: Thirumurti Narayan, Riverview, Mich.

[73] Assignee: BASF Wyandotte Corporation, Wyandotte, Mich.

[21] Appl. No.: 884,937

[22] Filed: Mar. 9, 1978

Related U.S. Application Data

[63] Continuation-in-part Ser. No. 792,519, May 3, 1977, abandoned.

[51] Int. Cl.$^2$ .................. C08G 18/14; C08G 18/20; C09K 3/00
[52] U.S. Cl. ................................. 521/115; 252/438; 521/117; 521/118; 521/128; 521/129; 521/130; 521/902
[58] Field of Search ............... 252/438; 521/129, 128, 521/115, 130, 117, 118, 902

[56] References Cited

U.S. PATENT DOCUMENTS

| | | | |
|---|---|---|---|
| 3,010,963 | 11/1961 | Erner | 260/2.5 AC |
| 4,040,992 | 8/1977 | Bechara | 260/2.5 AW |
| 4,066,580 | 1/1978 | Falkenstein et al. | 521/129 |

OTHER PUBLICATIONS

Acheson, Chemistry of the Heterocyclic Compounds, Interscience, N.Y., 1960, pp. 160-163.

Primary Examiner—H. S. Cockeram
Attorney, Agent, or Firm—Joseph D. Michaels; Bernhard R. Swick; Robert E. Dunn

[57] ABSTRACT

Reaction products of certain tertiary amines, alkylene oxides and carboxylic acids have been found to be outstanding catalysts for the preparation of polyisocyanurates, polyisocyanurate foams, polyurethane foams and poly(urethane-isocyanurate) foams. Typical tertiary amines are 1,3,5-tris (N,N-dialkylaminoalkyl-5-hexahydrotriazines, pyridine and bis-(N,N-dialkylaminoalkyl) ethers.

20 Claims, No Drawings

NOVEL CARBOXYLATE CATALYSTS FOR THE PREPARATION OF FOAMS CHARACTERIZED BY POLYISOCYANURATE, POLYURETHANE AND POLY (URETHANE-ISOCYANURATE) LINKAGES

CROSS-REFERENCE TO RELATED U.S. APPLICATION

The subject application is a continuation-in-part of U.S. patent application Ser. No. 792,519 filed May 3, 1977 and now abandoned.

BACKGROUND OF THE INVENTION

1. Field of the Invention

The present invention pertains to compositions of matter and particularly to novel reaction products of certain tertiary amines, alkylene oxides and carboxylic acids. More particularly the present invention concerns the use of these compounds in the preparation of rigid and flexible foams characterized by polyisocyanurate, polyurethane and poly(urethane-isocyanurate) linkages.

2. Prior Art

In U.S. Pat. No. 3,954,684 there is taught a catalyst comprising a tertiary amine trimerization catalyst and a quaternary ammonium salt of an alkanoic acid. This catalyst is used to prepare polyisocyanurate foams.

In U.S. Pat. No. 3,892,687 there is the teaching of the preparation of cellular polyurethanes and polyurethane modified polyisocyanurate employing catalysts composed of a tertiary amine and a quaternary hydroxyalkyl tertiary amine base.

In U.S. Pat. No. 3,746,709 there is taught an isocyanurate promoting catalyst comprising adducts of a tertiary amine and alkylene oxide and water.

In U.S. Pat. No. 4,040,992 there is taught the use of N-hydroxyalkyl quaternary ammonium carboxylate salts as catalysts for the preparation of polyisocyanurates and polyurethanes.

SUMMARY OF THE INVENTION

The present invention relates to an improved process for the preparation of polyisocyanurates, polyisocyanurate foams, polyurethane foams and poly(urethaneisocyanurate) foams employing a catalytically sufficient amount of the reaction product of a tertiary amine selected from the group consisting of 1,3,5-tris(N,N,-dialkylaminoalkyl)-s-hexahydrotriazines, pyridine and bis(N,N-dialkylaminoalkyl)ethers, an alkylene oxide and a carboxylic acid. It was surprising and unexpected to find that the use of these amines, alkylene oxide and carboxylic acid products provides for foams characterized by polyisocyanurate and polyurethane and poly(urethane-isocyanurate) linkages.

DESCRIPTION OF THE PREFERRED EMBODIMENTS

In accordance with the present invention rigid and flexible cellular foams are prepared by the catalytic reaction of an organic polyisocyanate in the presence of a catalytically sufficient amount of the reaction product of a tertiary amine selected from the group consisting of 1,3,5-tris(N,N-dialkylaminoalkyl)-s-hexahydrotriazines, pyridine and bis(N,N-dialkylaminoalkyl)ethers, an alkylene oxide and a carboxylic acid as hereinafter defined. The products which are produced in accordance herewith are rigid and cellular foam plastics containing isocyanurate linkages. Furthermore, cellular foams prepared by the catalytic condensation of an organic polyisocyanate with a polyol in the presence of a catalytically sufficient of an adduct of tertiary amine, alkylene oxide and carboxylic acid produce rigid or flexible cellular foam plastics containing both polyisocyanurate and polyurethane linkages. The catalysts display superior activity to prior art catalysts and furthermore are more economically attractive since lesser amounts of catalyst compared to prior art catalysts may be employed.

The new catalyst compositions which are useful in the preparation of polyisocyanurate and polyurethane are provided by reacting the amine, alkylene oxide and a carboxylic acid in a molar ratio of amine to oxide to acid of from 1:0.5:1 to 1:6:6.

Specific examples of the tertiary amines include
1,3,5-tris(N,N-dimethylaminoethyl)-s-hexahydrotriazine,
1,3,5-tris(N,N-dimethylaminopropyl)-s-hexahydrotriazine,
1,3,5-tris(N,N-diethylaminoethyl)-s-hexahydrotriazine,
1,3,5-tris(N,N-diethylaminopropyl)-s-hexahydrotriazine,
1,3,5-tris(N,N-dimethylamino-1-methylbutyl)-s-hexahydrotriazine,
pyridine,
bis(N,N-dimethylaminoethyl)ether, and
bis(N,N-diethylaminoethyl)ether.

Suitable alkylene oxides are those which contain 2 to 18 carbon atoms, and include ethylene oxide, propylene oxide, 1,2-butylene oxide, 1,2-pentane oxide, styrene oxide, phenylglycidylether, butadiene oxide, glycidyl ethers of substituted phenols, diglycidyl ethers of bisphenols, glycidyl ether of resorcinol, glycidyl ethers of novolaks, and glycidyl ethers of aliphatic alcohols. Preferred are propylene oxide and diglycidyl ether of bisphenol A.

Among the acids which may be employed are those alkyl acids containing from 1 to 18 carbon atoms and aryl acids having 7 to 14 carbon atoms, aralkyl and alkylaryl acids having 8 to 16 carbon atoms and heterocyclic carboxylic acids containing 6 to 10 carbon atoms. Representative acids include aliphatic acids such as formic acid, acetic acid, butanoic acid, pentanoic acid, nonanoic acid; N,N-dimethylaminoacetic acid, acetoacetic acid, pyruvic acid, cyclopropanecarboxylic acid, cyclobutanecarboxylic acid, cyclopentanecarboxylic acid, cyclohexanecarboxylic acid; unsaturated acids such as acrylic acid, methacrylic acid, furylacrylic acid; acids having electron withdrawing groups such as mono, di and trichloroacetic acids, cyanoacetic acid; aryl acids such as benzoic acid, naphthoic acid, diphenylcarboxylic acid; alkaryl acids such as ortho and paratoluic acids; N,N-dimethylaminobenzoic acid, methylnaphthoic acid; aralkyl acids such as phenylacetic acid, cinnamic acid, phenyl propionic acid and heterocyclic acids such as furancarboxylic acid, thiophenecarboxylic acid, pyridinecarboxylic acid, pyrazinecarboxylic acid.

The general procedure employed for the preparation of the catalysts is as follows: The desired amount of tertiary amine and solvent, if used, is added to a reaction vessel. Alkylene oxide is then added dropwise. If any exotherm occurs, the reaction mixture is allowed to reach a maximum temperature. The carboxylic acid is then added dropwise. After the addition has been completed, the reaction temperature is increased to 75° C. and maintained at that temperature for a period of from 5 minutes to 5 hours preferably from 30 minutes to 2 hours. The resulting products are then employed as catalysts. The temperature may range from 10° C. to 200° C., preferably from 20° C. to 150° C.

The organic polyisocyanate used in the preparation of foams in accordance with the present invention include aromatic, aliphatic and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenylmethane-4,4'-diisocyanate, 4,4'-diphenylenediisocyanate, 3,3'-dimethoxy-4,4'-biphenyldiisocyanate, 3,3'-dimethyl-4,4'-biphenyldiisocyanate, and 3,3'-dimethyldiphenylmethane-4,4'-diisocyanate; the triisocyanates such as 4,4',4''-triphenylmethanetriisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are the toluene diisocyanates, diphenylmethane-4,4'-diisocyanate, and polymethylenepolyphenyl isocyanate. These isocyanates are prepared by conventional methods known in the art such as the phosgenation of the corresponding organic amine.

Crude polyisocyanate may also be used in the compositions of the present invention such as crude toluene diisocyanate, obtained by the phosgenation of a mixture of toluene diamines or crude diphenylmethane diisocyanate obtained by the phosgenation of crude diphenylmethanediamine.

The polyols which are employed in the preparation of the foamed compositions include for example the oxyalkylene adducts of polyol bases wherein the oxyalkylene portion is derived from a monomeric unit which has ethylene oxide, propylene oxide, butylene oxide and mixtures thereof. The polyol initiators include ethylene glycol, 1,2-propylene glycol, 1,3-propylene glycol, 1,2-butanediol, 1,4-butanediol, hexanetriol, glycerol, trimethylolpropane, triethylolpropane, pentaerythritol, sorbitol, sucrose, toluene diamine and bisphenol A, polyethers such as polyethylene ether glycols, polypropylene ether glycols, polytetramethylene ether glycols, and alkylene oxide adducts of polyhydric alcohols including those listed above; hydroxy terminated tertiary amines of the formula:

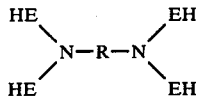

wherein R is an alkylene radical containing at least 2 to 6 carbon atoms and E is a polyoxyalkylene chain; amine based polyethers of the formula:

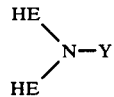

wherein E is a polyoxyalkylene chain and Y is selected from the group consisting of alkyl, hydroxyalkyl and EH; alkylene oxide adducts of acids of phosphorus such as the adducts prepared by the reaction of phosphoric acid and ethylene oxide, phosphoric acid and propylene oxide, phosphorus acid and propylene oxide, phosphonic acid and ethylene oxide, phosphinic acid and butylene oxide, polyphosphoric acid and propylene oxide and phosphonic acid and styrene oxide.

Typical polyether polyols include polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, and poly-1,4-oxybutylene and polyoxyethylene glycols, and random copolymer glycols prepared from blends or sequential addition of two or more alkylene oxides. Also adducts of the above with trimethylolpropane, glycerine and hexanetriol as well as the polyoxypropylene adducts of higher polyols such as pentaerythritol and sorbitol may be employed. Thus the polyether polyols which can be employed in this process are oxyalkylene polymers which have an oxygen/carbon ratio from about 1:2 to 1:4 and preferably an oxygen carbon atom ratio from about 1:2.8 to 1:4 and from about 2 to 6 terminal hydroxyl groups preferably about 2 to 4 terminal hydroxyl groups. The polyether polyols generally have an average equivalent weight from about 150 to 10,000 and preferably have an average equivalent weight from about 200 to about 6000, polyoxypropylene glycols having molecular weights from abut 400 to about 4000 corresponding to equivalent weights from about 200 to 1000 and mixtures thereof are particularly useful as polyol reactants. Polyol blends such as a mixture of high molecular weight polyether polyols with lower molecular weight polyether polyols or monomeric polyols can also be employed.

Any suitable hydroxy terminated polyester may also be used. These can be obtained from the reaction of polycarboxylic acids and polyhydric alcohols. Such suitable polycarboxylic acid may be oxalic acid, malonic acid, succinic acid, glutaric acid, adipic acid, pimelic acid, suberic acid, azelaic acid, sebacic acid, basillic acid, thapsic acid, maleic acid, fumeric acid, glutaconic acid, isophthalic acid and terphthalic acid. Suitable polyhydric alcohols include the following: ethylene glycol, 1,2-propylene glycol, 1,3-propylene glycol, 1,2-butylene glycol, 1,3-butylene glycol, 1,4-butylene glycol, 1,3-pentanediol, 1,4-pentanediol, 1,5-pentanediol, 1,6-hexanediol, 1,7-hexanediol, glycerol, trimethylolpropane, trimethylolethane, hexane 1,2,6-triol, α-methylglucoside, pentaerythritol, sorbitol, sucrose, and compounds derived from phenols such as 2,2-bis(4-hydroxyphenol)propane.

In addition to the above hydroxy-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10 percent polymer concentration.

A more comprehensive discussion of the graft polyols and their method of preparation can be found in U.S. Pat. Nos. 3,383,351; 3,304,273, and 3,652,629, the disclosures of which are hereby incorporated by reference.

Blowing agents which are employed in the present invention are well known to those skilled in the art. Representative blowing agents include water, fluorocarbons such as tetrafluoromethane, bromotrifluoromethane, chlorotrifluoromethane, dibromodifluoromethane, trichlorethylene, chloroform, carbon tetrachloride and low boiling hydrocarbons such as butane, pentane and hexane. Included are the blowing agents disclosed in U.S. Pat. No. 3,922,238 which disclosure is herein incorporated by reference.

The polyisocyanurate foams of the present invention are prepared by mixing together the organic polyisocyanate, the catalyst and the blowing agent at initiating temperatures ranging from 0° C. to 150° C. In the event that polyurethane foams or mixed polyisocyanurate-polyurethane foams are desired, these are prepared by mixing together the organic polyisocyanate with the desired polyol, catalyst and a blowing agent, also at temperatures ranging from 0° C. to 150° C.

The poly(isocyanurate-urethane) foams are prepared by reacting 0.01 to 0.5 equivalents of polyol with one equivalent of polyisocyanate said polyol having an average functionality of 2 to 3 and an average hydroxyl number equivalent weight of 100 to 3000.

The polyurethane foams are prepared by reacting the polyol and polyisocyanate on an essentially 1:1 equivalent basis.

Other additives may also be included in the foam formulations. Included are surfactants such as the silicone surfactants, e.g., alkylpolysiloxanes and polyalkyl siloxanes, flame retardants such as tris(2-chloroethyl)phosphate.

Additional optional catalysts may also be employed. Included are such catalysts as dibutyltin dilaurate, dibutyltin diacetate, stannous octoate, lead octoate, and cobalt naphthenate.

The densities of the foams which may be produced incorporating the novel catalysts of the instant invention range from 1 to 60 lbs. per cubic foot.

The test methods employed to determine the properties of the foams are tabulated below:
  Density: ASTM D 1622-23 (1970)
  K-factor: ASTM C 518-177-45
  Compression strength: ASTM D 1621-73
  Tumbling friability: ASTM C 421
  Flame retardancy: ASTM D 3014
  Smoke density: NBS Chamber The foams were characterized by infra-red spectroscopy. Thus the foams exhibited isocyanurate, urethane and combined urethane-isocyanurate linkages.

The examples below illustrate the preparation of the catalysts of the present invention and their use in the preparation of polyisocyanurate and polyurethane foams.

In the Tables below, the following abbreviations are employed:
  BDAE=bis(N,N-dimethylaminoethyl)ether
  DC-193[1]=polyoxyethylene-polyalkylsiloxane copolymer surfactant
  DGEBPA=diglycidyl ether of bisphenol A
  DMAE=N,N-dimethylaminoethanol
  DMCHA=N,N-dimethylcyclohexylamine
  DPG=dipropylene glycol
  EHA=2-ethylhexanoic acid
  FREON 11-B[2]=monofluorotrichloromethane
  FYROL CEF[3]=tris(2-chlroethyl)phosphate
  L-5303[4]=silicone surfactant
  L-5340[5]=silicone surfactant
  NEM=N-ethylmorpholine
  PO=propylene oxide
  Polyol A=polyoxyethylated trimethylolpropane having a hydroxyl number equivalent weight of 250
  Polyol B=polyoxypropylated trimethylolpropane having a hydroxyl number equivalent weight of 250
  Polyol C=reaction product of tetrabromophthalic anhydride and an oxypropylated pentaerythritol having a hydroxyl number equivalent weight of 100 to which sufficient propylene oxide is added to give a hydroxyl number equivalent weight of 246
  Polyol D=polyoxyethylated, polyoxypropylated trimethylolpropane having a molecular weight of 6000 and containing about 10 weight percent ethylene oxide
  Polyol E=polyoxypropylated toluene diamine having a molecular weight of about 400
  Polyol F=polyoxypropylated pentaerythritol having a molecular weight of about 425
  RUBINATE M[6]=polymethylene polyphenyl polyisocyanate, equivalent weight ca. 137
  TAC=tertiary amine, alkylene oxide and carboxylic acid reaction product
  TDH=1,3,5-tris(N,N-dimethylaminopropyl)-s-hexahydrotriazine
  TDI=2,4- and 2,6-toluene diisocyanate blend 80/20 ratio
  TEA=triethylamine
  TEDA=triethylenediamine

[1] manufactured by Dow Corning
[2] manufactured by du Pont
[3] manufactured by Stauffer Chemical
[4] manufactured by Union Carbide Corporation
[5] manufactured by Union Carbide Corporation
[6] manufactured by Rubicon Inc.

EXAMPLE 1

This example illustrates the process employed for the preparation of the reaction products of tertiary amine-alkylene oxide-carboxylic acid in accordance with the present invention. Into a 250 ml reaction flask equipped with a thermometer, dry-ice condenser, mechanical stirrer, addition funnel and a heating mantle, 34.2 grams of TDH was placed. Stirring was commenced and 34.8 grams of propylene oxide was added drop-wise at a temperature of 25° C. over a period of 25 minutes. Upon completing the addition of the propylene oxide, 86.4 grams of EHA dissolved in 77.7 grams of DPG was added drop-wise over a period of 1 hour and 15 minutes with the temperature rising to 43° C. The reaction mixture was then heated to 74° C. and maintained at that temperature for 2 hours. Examination by infra-red spectroscopy disclosed the appearance of the carboxyl absorption and absence of absorptions attributable to propylene oxide. The reaction products 2–23 were prepared in a similar manner employing the reactants and concentrations as designated in Table I below.

Table I

Preparation of TAC Reaction Products

| Reaction Product | DPG | Tertiary Amine | g. | mole | Alkylene Oxide | g. | mole | Carboxylic Acid | g. | mole |
|---|---|---|---|---|---|---|---|---|---|---|
| 1 | 77.7 | TDH | 34.2 | 0.1 | PO | 34.8 | 0.6 | EHA | 86.4 | 0.6 |
| 2 | none | TDH | 68.4 | 0.2 | PO | 11.6 | 0.2 | EHA | 28.8 | 0.2 |
| 3 | none | TDH | 68.4 | 0.2 | PO | 23.2 | 0.4 | EHA | 57.6 | 0.4 |
| 4 | none | TDH | 68.4 | 0.2 | PO | 34.8 | 0.6 | EHA | 86.4 | 0.6 |
| 5 | 46 | TDH | 68.4 | 0.2 | PO | 11.6 | 0.2 | acetic | 12.0 | 0.2 |
| 6 | 47.2 | TDH | 68.4 | 0.2 | PO | 11.6 | 0.2 | acrylic | 14.4 | 0.2 |
| 7 | 52.2 | TDH | 68.4 | 0.2 | PO | 11.6 | 0.2 | benzoic | 24.4 | 0.2 |
| 8 | 44.6 | TDH | 68.4 | 0.2 | PO | 11.6 | 0.2 | formic | 9.2 | 0.2 |
| 9 | 55.0 | TDH | 68.4 | 0.2 | PO | 23.2 | 0.4 | formic | 18.4 | 0.4 |
| 10 | 65.4 | TDH | 68.4 | 0.2 | PO | 34.8 | 0.6 | formic | 27.6 | 0.6 |
| 11 | 48.4 | TDH | 68.4 | 0.2 | PO | 11.6 | 0.2 | formic | 17.4 | 0.2 |
| 12 | 47.1 | TEDA | 33.6 | 0.3 | PO | 17.4 | 0.3 | EHA | 43.2 | 0.3 |
| 13 | 60.6 | TEA | 40.4 | 0.4 | PO | 23.2 | 0.4 | EHA | 57.6 | 0.4 |
| 14 | 58.2 | DMAE | 35.6 | 0.4 | PO | 23.2 | 0.4 | EHA | 57.6 | 0.4 |
| 15 | 65.8 | DMCHA | 50.8 | 0.4 | PO | 23.2 | 0.4 | EHA | 57.6 | 0.4 |
| 16 | 56.2 | pyridine | 31.6 | 0.4 | PO | 23.2 | 0.4 | EHA | 57.6 | 0.4 |
| 17 | 74.6 | BDAE | 49.0 | 0.3 | PO | 17.4 | 0.3 | EHA | 43.2 | 0.3 |
| 18 | 63.4 | NEM | 46.0 | 0.4 | PO | 23.2 | 0.4 | EHA | 57.6 | 0.4 |
| 19 | 70.6 | BDAE | 48.0 | 0.3 | PO | 17.4 | 0.3 | formic | 13.8 | 0.3 |
| 20 | 36.3 | pyridine | 31.6 | 0.4 | PO | 23.2 | 0.4 | formic | 18.4 | 0.4 |
| 21 | 38.6 | DMAE | 35.6 | 0.4 | PO | 23.2 | 0.4 | formic | 18.4 | 0.4 |
| 22 | 65.6 | TDH | 68.4 | 0.2 | DGEBPA | 34.0 | 0.2 | EHA | 28.8 | 0.2 |
| 23 | 63.8 | BDAE | 24.0 | 0.25 | DGEBPA | 51.0 | 0.3 | EHA | 21.6 | 0.15 |

EXAMPLE 2

This series of polyisocyanurate foams was prepared by the addition of the designated catalyst to a reaction vessel which contained 100 parts by weight (pbw) RUBINATE M, 25 pbw FREON 11-B and 1 pbw DC-193. The above mixture was stirred at a high speed until foam generation began. The reactivities were determined by measuring the cream time, gel time, tack free time and final rise time for all formulations. The procedures employed for these determinations are well known to those skilled in the art. In the following formulations of the catalyst, all concentrations are parts by weight (pbw).

Catalyst 1—TDH (5).
Catalyst 2—TDH (5), DPG (2).
Catalyst 3—TDH (5), DPG (2) and PO (2).
Catalyst 4—TDH (3.3), PO (0.6), H$_2$O (0.2) in DPG (1.9).
Catalyst 5—TEDA (1.2), PO (0.32), phenol (0.50) in DPG (2.8).
Catalyst 6—TEDA (1.2), PO (1.68), EHA (1.53) in DPG (1.66).
Catalyst 7—TDH (1.57), PO (0.27), EHA (0.66), DPG (2.5).
Catalyst 8—DMAE (1.02), PO (0.66), EHA (1.65) in DPG (1.67).

Table II

| Catalyst Type | Cream Time Sec. | Gel Time Sec. | Tack Free Time/Sec. | Final Rise Time/Sec. |
|---|---|---|---|---|
| 1 | 170 | 300 | 300 | 360 |
| 2 | 40 | 120 | 120 | 180 |
| 3 | 40 | 120 | 135 | 180 |
| 4 | 15 | 45 | 100 | 110 |
| 5 | not curing even after 6 minutes | | | |
| 6 | 5 | 10 | 20 | 25 |
| 7 | 3 | <10 | <10 | <10 |
| 8 | 4 | 25 | 50 | 35 |

These results indicate that the catalyst of the present invention, number 7 has a superior reactivity to those of the prior art in the formation of polyisocyanurates.

EXAMPLE 3

The TAC products of Example 1 were evaluated as polyisocyanurate foam catalysts. Into a suitable vessel was added 100 parts by weight (pbw) RUBINATE M, 25 pbw FREON 11-B, 1 pbw DC-193 and 5 pbw of the indicated reaction products. The mixture was vigorously stirred and the foams were allowed to develop. The reactivities of the various products were determined by measuring the cream time, gel time, tack free time and rise time. The results tabulated in Table III indicate the suitability of these products as catalysts for the formation of polyisocyanurate foams.

Table III

| TAC Reaction Product No. | Cream | Gel | Rise | Tack Free |
|---|---|---|---|---|
| 1 | 12 | 25 | 35 | 70 |
| 2 | 3 | <10 | <10 | <10 |
| 3 | 3 | <10 | <10 | <10 |
| 4 | 3 | 10 | 10 | 10 |
| 5 | 7 | 15 | 20 | 60 |
| 7 | 10 | 12 | 25 | 35 |
| 8 | 15 | 45 | 110 | 110 |
| 9 | 20 | 30 | 50 | 100 |
| 10 | 40 | 75 | 120 | 240 |
| 11 | 3 | — | 20 | 20 |
| 12 | 5 | 10 | 20 | 25 |
| 13 | 7 | 12 | 20 | 20 |
| 14 | 14 | 25 | 35 | 50 |
| 15 | 5 | — | 10 | 15 |
| 16 | 3 | — | 10 | 10 |
| 17 | 4 | — | 12 | 12 |
| 18 | 20 | 50 | 70 | 70 |
| 19 | 14 | 20 | 35 | 35 |
| 20 | 14 | 25 | 35 | 60 |
| 21 | 90 | 120 | 150 | 240 |
| 22 | 10 | 15 | 25 | 30 |
| 23 | 145 | 165 | 190 | 185 |

(Reactivity in Seconds)

EXAMPLE 4

The TAC reaction products of Example 1 were evaluated as poly(urethane-isocyanurate) foam catalysts. Into a suitable vessel was added 100 pbw RUBINATE M, 25 pbw FREON 11-B. Then a mixture of 1 pbw DC-193, 20 pbw Polyol A and the amount of products as indicated was added. The mixture was stirred and in a few seconds the foam developed. The reactivities of the various products were determined by measuring the cream time, gel time, tack free time and rise time. The results of Table IV indicate that these products are suitable catalysts for the preparation of poly(urethane-isocyanurate) foams.

Table IV

| TAC Reaction Product No. | Amount g. | Reactivity in Seconds | | | |
|---|---|---|---|---|---|
| | | Cream | Gel | Rise | Tack Free |
| 1 | 2 | 10 | 30 | 45 | 90 |
| 2 | 2 | 6 | 14 | 30 | 50 |
| 3 | 2 | 5 | 10 | 15 | 35 |
| 4 | 2 | 4 | 10 | 20 | 30 |
| 5 | 2 | 5 | 14 | 30 | 90 |
| 6 | 2 | 6 | 15 | 30 | 95 |
| 7 | 2 | 8 | 20 | 35 | 120 |
| 8 | 2 | 5 | 60 | 120 | 160 |
| 9 | 2 | 8 | 12 | 30 | 40 |
| 10 | 2 | 8 | 12 | 30 | 30 |
| 11 | 2 | 7 | 14 | 45 | 55 |
| 12 | 2 | 6 | 25 | 40 | 120 |
| 13 | 2 | 10 | 30 | 50 | 150 |
| 14 | 2 | 8 | 15 | 30 | 45 |
| 15 | 2 | 11 | 36 | 60 | 140 |
| 16 | 2 | 10 | 25 | 40 | 110 |
| 17 | 2 | 6 | 15 | 35 | 60 |
| 18 | 5 | 12 | 30 | 50 | 150 |
| 19 | 2 | 10 | 20 | 35 | 35 |
| 20 | 2 | 11 | 16 | 30 | 30 |
| 21 | 2 | 12 | 20 | 40 | 40 |
| 22 | 2 | 10 | 25 | 50 | 160 |
| 23 | 3 | 10 | 25 | 45 | 150 |

EXAMPLE 5

The TAC products of Example 1 were evaluated employing Polyol B instead of Polyol A and the designated concentrations of TAC reaction product. The results as obtained and tablulated in Table V below indicate the suitability of the products as poly(urethane-isocyanurate) foam catalysts.

Table V

| TAC Reaction Product No. | Amount g. | Reactivity in Seconds | | | |
|---|---|---|---|---|---|
| | | Cream | Gel | Rise | Tack Free |
| 1 | 3 | 20 | 45 | 65 | 90 |
| 2 | 2 | 15 | 30 | 60 | 75 |
| 3 | 2 | 12 | 25 | 40 | 65 |
| 4 | 2 | 18 | 30 | 55 | 80 |
| 5 | 2 | 14 | 30 | 70 | 120 |
| 6 | 2 | 20 | 30 | 40 | 60 |
| 7 | 2 | 40 | 65 | 105 | 150 |
| 8 | 2 | 40 | 130 | 240 | 180 |
| 9 | 2 | 25 | 45 | 70 | 120 |
| 10 | 2 | 45 | 90 | 130 | 190 |
| 11 | 2 | 20 | 35 | 75 | 90 |
| 12 | 3 | 10 | 14 | 30 | 30 |
| 13 | 3 | 20 | 50 | 80 | 130 |
| 14 | 2 | 18 | 35 | 50 | 70 |
| 15 | 2 | 12 | 45 | 70 | 120 |
| 16 | 3 | 9 | 20 | 35 | 35 |
| 17 | 2 | 12 | 40 | 65 | 95 |
| 18 | 5 | 25 | 70 | 90 | 360 |
| 19 | 2 | 20 | 45 | 70 | 70 |
| 20 | 2 | 18 | 30 | 40 | 40 |
| 21 | 3 | 40 | 65 | 90 | 110 |
| 22 | 4 | 14 | 30 | 40 | 55 |
| 23 | 5 | 23 | 45 | 70 | 70 |

EXAMPLE 6

The activity of the TAC reaction products as "cold-cure" flexible polyurethane foam catalysts is determined in the following manner.

| FORMULATION | |
|---|---|
| Polyol D | 150.00 g. |
| Distilled water | 4.05 ml. |
| L5303 surfactant | 3.00 ml. |
| TAC Reaction Product | See Table VI |
| Dibutyltin dilaurate | 0.05 ml. |
| TDI/RUBINATE M (80/20; w/w/) | 51.00 g. |

Polyol D, distilled water, L5303 and the TAC reaction product were mixed for 30 seconds using a LIGHTIN Model V-7 stirrer equipped with a 1½" shrouded mixing blade. Dibutyltin dilaurate was then added and mixed for another 15 seconds. Thereafter, the TDI/RUBINATE M mixture was added, mixed for 5 seconds, poured into a one-gallon "cake-box" and the foam was allowed to rise therein. Thereafter, the foam was cured in an oven for 8 minutes at 120° C. The cream, gel and rise time was determined and is shown in the table.

Table VI

| TAC Reaction Product No. | Amount, g. | Reactivity in Seconds | | |
|---|---|---|---|---|
| | | Cream | Gel | Rise |
| 2 | 1.05 | 15 | 130 | 170 |
| 2 | 2.10 | 10 | 85 | 120 |
| 5 | 1.05 | 11 | 70 | 125 |
| 5 | 2.10 | 87 | 40 | 80 |
| 6 | 1.05 | 17 | 155 | 210 |
| 6 | 2.10 | 12 | 105 | 160 |
| 7 | 1.05 | 18 | 145 | 200 |
| 7 | 2.10 | 14 | 110 | 165 |
| 8 | 1.05 | 11 | 60 | 115 |
| 8 | 2.10 | 9 | 55 | 95 |
| 12 | 1.05 | 18 | 140 | 180 |
| 12 | 2.10 | 14 | 107 | 155 |
| 13 | 1.05 | 22 | 240 | 360 |
| 13 | 2.10 | 17 | 160 | 200 |
| 14 | 1.05 | 9 | 170 | 240 |
| 14 | 2.10 | 10 | 110 | 175 |

EXAMPLE 7

A series of poly(urethane-isocyanurate) foams was prepared employing representative reaction products of the instant invention. The indicated quantities of RUBINATE M and FREON 11-B were mixed in a suitable container. The indicated amounts of polyol blend, TAC reaction product and DC-193 were mixed together in a separate container. While stirring the isocyanate blend, the polyol mixture was rapidly added to it. When the foaming process began, the entire mixture was poured into 10"×10"×2" molds. After allowing the foam to stay in the mold for 15 minutes, the foam was removed and stored for two days before some of the foam properties were determined.

Table VII

| Foam No. | 1 | 2 | 3 | 4 |
|---|---|---|---|---|
| Isocyanate Component | | | | |
| RUBINATE M, g. | 200 | 200 | 200 | 200 |
| FREON 11-B, g. | 50 | 50 | 50 | 50 |
| Resin Component | | | | |
| Polyol A, g. | 30 | 30 | 30 | 30 |
| Polyol C, g. | 10 | 10 | 10 | 10 |
| TAC Reaction Product | 1 | 14 | 17 | 19 |
| TAC amount, g. | 5 | 5 | 5 | 5 |
| DC-193, g. | 2 | 2 | 2 | 2 |
| Foam Properties | | | | |
| Density, pcf. | 2.1 | 2.0 | 1.7 | 1.6 |
| Compressive strength, psi. 10% deflection | 19 | 22 | 22 | 22 |
| K factor, initial | 0.109 | 0.108 | 0.121 | 0.120 |
| aged 10 days at 140° F. | 0.138 | 0.144 | 0.165 | 0.167 |

Table VII-continued

| Foam No. | 1 | 2 | 3 | 4 |
|---|---|---|---|---|
| Friability, % wt. loss | 6 | 6 | 16 | 14 |
| Butler Chimney Test | | | | |
| wt. retained, % | 88 | 88 | 90 | 86 |
| flame ht., inches | 7 | 7 | 7 | 7 |
| time to SX, sec. | 10 | 10 | 10 | 10 |
| NBS smoke density, $D_m$ | 69 | 63 | 52 | 57 |

The embodiments of the invention in which an exclusive property or privilege is claimed are defined as follows:

1. A composition which is the reaction product of
   (a) a tertiary amine selected from the group consisting of 1,3,5-tris(N,N-dialkylaminoalkyl)-s-hexahydrotriazines, pyridine and bis(N,N-dialkylaminoalkyl)ethers,
   (b) an alkylene oxide containing from 2 to 18 carbon atoms, and
   (c) a mono-carboxylic acid
employing a mole ratio of (a) to (b) to (c) of from 1:0.5:1 to 1:6:6.

2. The composition of claim 1 wherein said tertiary amines is 1,3,5-tris(3-dialkylaminopropyl)-s-hexahydrotriazine.

3. The composition of claim 1 wherein said tertiary amine is bis(N,N-dimethylaminoethyl)ether.

4. The composition of claim 1 wherein said acid is selected from the group consisting of 2-ethylhexanoic acid, acetic acid, and formic acid.

5. The composition of claim 1 wherein the alkylene oxide is propylene oxide.

6. A process for the preparation of a cellular foam characterized by polyisocyanurate linkages which comprises reacting an organic polyisocyanate in the presence of a catalytically sufficient amount of a catalyst which is the reaction product of
   (a) a tertiary amine, selected from the group consisting of 1,3,5-tris(N,N-dialkylaminoalkyl)-s-hexahydrotriazines, pyridine and bis(N,N-dialkylaminoalkyl)ethers,
   (b) an alkylene oxide containing from 2 to 18 carbon atoms, and
   (c) a mono-carboxylic acid
employing a mole ratio of (a) to (b) to (c) of from 1:0.5:1 to 1:6:6.

7. The process of claim 6 wherein said tertiary amine is 1,3,5-tris(3-dimethylaminopropyl)-s-hexahydrotriazine.

8. The process of claim 6 wherein said tertiary amine is bis(N,N-dimethylaminoethyl)ether.

9. The process of claim 6 wherein said acid is selected from the group consisting of 2-ethylhexanoic acid, acetic acid, and formic acid.

10. The process of claim 6 wherein the alkylene oxide is propylene oxide.

11. A process for the preparation of a cellular foam characterized by polyisocyanurate and polyurethane linkages which comprises reacting one equivalent of an organic polyisocyanate and from 0.01 to 0.5 equivalents of a polyol in the presence of a catalytically sufficient amount of a catalyst which is the reaction product of
    (a) a tertiary amine selected from the group consisting of 1,3,5-tris(N,N-dialkylaminoalkyl)-s-hexahydrotriazines, pyridine and bis(N,N-dialkylaminoalkyl ethers,
    (b) an alkylene oxide containing from 2 to 18 carbon atoms, and
    (c) a mono-carboxylic acid
employing a mole ratio of (a) to (b) to (c) of from 1:0.5:1 to 1:6:6.

12. The process of claim 11 wherein said tertiary amine is 1,3,5-tris(3-dimethylaminopropyl)-s-hexahydrotrizine.

13. The process of claim 11 wherein said tertiary amine is bis(N,N-dimethylaminoethyl)ether.

14. The process of claim 11 wherein said acid is selected from the group consisting of 2-ethylhexanoic acid, acetic acid, and formic acid.

15. The process of claim 11 wherein the alkylene oxide is propylene oxide.

16. A process for the preparation of a cellular foam characterized by polyurethane linkages which comprises reacting an organic polyisocyanate and a polyol, on an essentially 1:1 equivalent basis, in the presence of a catalytically sufficient amount of a catalyst which is the reaction product of
    (a) a tertiary amine selected from the group consisting of 1,3,5-tris(N,N-dialkylaminoalkyl)-s-hexahydrotriazines, pyridine and bis(N,N-dialkylaminoalkyl)ethers,
    (b) an alkylene oxide containing from 2 to 18 carbon atoms, and
    (c) a carboxylic acid
employing a mole ratio of (a) to (b) to (c) of from 1:0.5:1 to 1:6:6.

17. The process of claim 16 wherein said tertiary amine is 1,3,5-tris(3-dimethylaminopropyl)-s-hexahydrotriazine.

18. The process of claim 16 wherein said tertiary amine is bis(N,N-dimethylaminoethyl)ether.

19. The process of claim 16 wherein said acid is selected from the group consisting of 2-ethylhexanoic acid, acetic acid, and formic acid.

20. The process of claim 16 wherein the alkylene oxide is propylene oxide.

* * * * *